US005517319A

United States Patent [19]
Arai

[11] Patent Number: 5,517,319
[45] Date of Patent: May 14, 1996

[54] APPARATUS FOR COMBINING DIVIDED PORTIONS OF LARGER IMAGE INTO A COMBINED IMAGE

[75] Inventor: Hiroshi Arai, Yokohama, Japan

[73] Assignee: Ricoh Company, Ltd., Tokyo, Japan

[21] Appl. No.: 976,363

[22] Filed: Nov. 18, 1992

[30] Foreign Application Priority Data

Nov. 19, 1991 [JP] Japan ................... 3-329853

[51] Int. Cl.$^6$ .............. H04N 1/29; H04N 1/387; H04N 1/393
[52] U.S. Cl. ............. 358/300; 358/296; 358/450; 358/451
[58] Field of Search ................. 358/296, 450, 358/451, 452, 453, 479, 537, 540; 382/56, 232, 312, 319; 395/135

[56] References Cited

U.S. PATENT DOCUMENTS

| | | | |
|---|---|---|---|
| 4,862,285 | 8/1989 | Miyakawa | 358/451 |
| 5,018,023 | 5/1991 | Kubota | 358/450 |
| 5,028,991 | 7/1991 | Sekizawa et al. | 358/75 |
| 5,051,843 | 9/1991 | Hayashi | 358/450 |
| 5,113,267 | 5/1992 | Lee | 358/450 X |
| 5,115,320 | 5/1992 | Ebihara et al. | 358/296 |
| 5,122,833 | 6/1992 | Sato | 355/203 |
| 5,191,440 | 3/1993 | Levine | 358/450 |
| 5,231,516 | 7/1993 | Kamon et al. | 358/450 X |
| 5,247,372 | 9/1993 | Tsutamori et al. | 358/452 |
| 5,325,209 | 6/1994 | Manable | 358/437 |

FOREIGN PATENT DOCUMENTS

| | | |
|---|---|---|
| 1-129662 | 5/1989 | Japan . |
| 1-129660 | 5/1989 | Japan . |
| 2-81563 | 3/1990 | Japan . |

*Primary Examiner*—Peter S. Wong
*Assistant Examiner*—Eric Frahm
*Attorney, Agent, or Firm*—Woodcock Washburn Kurtz Mackiewicz & Norris

[57] ABSTRACT

An image combining device scans an image on a large document and prints it. The device includes a memory for storing image signals. In accordance with a first aspect of the device, a scanner scans areas of the document which are individually smaller than the area of the entire document, but combines the areas so as provide an eye-readable representation of the image which was on the large document. This is achieved quickly and efficiently by adjusting a magnification ratio applied to scanned image data, so as to allow the data to fit within the memory. In accordance with another aspect of the device, the combination of the images and the printing of the output are achieved by compressing image data using a binarization processor.

11 Claims, 7 Drawing Sheets

APPARATUS FOR COMBINING DIVIDED PORTIONS OF LARGER IMAGE INTO A COMBINED IMAGE

BACKGROUND OF THE INVENTION

1. Field of the Invention

The present invention relates to an image combining apparatus, for use in a digital copying machine. The invention relates, particularly, to an image combining apparatus for combining divided images obtained when reading a large size document.

2. Discussion of Background

Generally speaking, in a digital copying machine that reads an image of a document by photo-electric conversion, there is an apparatus for combining an image reading memory and an automatic document conveying device which results in faster copying. Such an apparatus is disclosed in Japanese Patent Laid-Open Publication No. 81563/1990.

Moreover, as disclosed in Japanese Patent Laid-Open Publications Nos. 129660/1989 and 129662/1989, when images in plural documents are read and combined with one another, a scanner reads each image in only desired areas in each of the plural documents. As a result a reduction of memory capacity is achieved.

In these conventional apparatuses, however, the apparatus disclosed in Japanese Patent Laid-Open publication No. 81563/1990 does not refer to image combining for plural documents. On the other hand, in the apparatuses as disclosed in Japanese Patent Laid-Open Publications Nos. 129660/1989 and 129662/1989, a reading sensor moves to the desired areas in the documents by an input area signal. Alternatively, image data other than the desired area are masked. As a result, these alternatives provide complicated structures and difficult operations.

There is thus a need for an image combining apparatus for recombining into a single image, divided images obtained when reading a large size document where the image scanning area is less than the area of the large document. The present invention fills that and other needs.

SUMMARY OF THE INVENTION

Accordingly, one object of this invention is to provide an image combining apparatus which combines images through the use of a simple apparatus and operation.

Another object of this invention is to provide an image combining apparatus which reads documents that are larger than the size of the reading apparatus.

These and other objects and advantages of are achieved by the present invention which provides for combining a magnifier with an image holding memory. In accordance with one aspect of the invention, an image combination is achieved briefly and efficiently by adjusting a magnification ratio the size of the image represented by the scanning signal to fit within the storage capacity of the image holding memory. In accordance with another aspect of the invention, an image combination is also achieved briefly and efficiently by compressing image data by a binarization processor.

BRIEF DESCRIPTION OF THE DRAWINGS

In describing preferred embodiments of the present invention illustrated in the drawings, specific terminology is employed for the sake of clarity. However, the invention is not intended to be limited to the specific terminology so selected, and it is to be understood that each specific element includes all technical equivalents which operate in a similar manner to accomplish a similar purpose.

A more complete appreciation of the invention and the many attendant advantages thereof will become readily apparent from the following detailed description, particularly when considered in conjunction with the drawing in which:

FIG. 5b shows the clock signals associated with the scanning of FIG. 5a;

DESCRIPTION OF THE PREFERRED EMBODIMENTS

Figure 1:
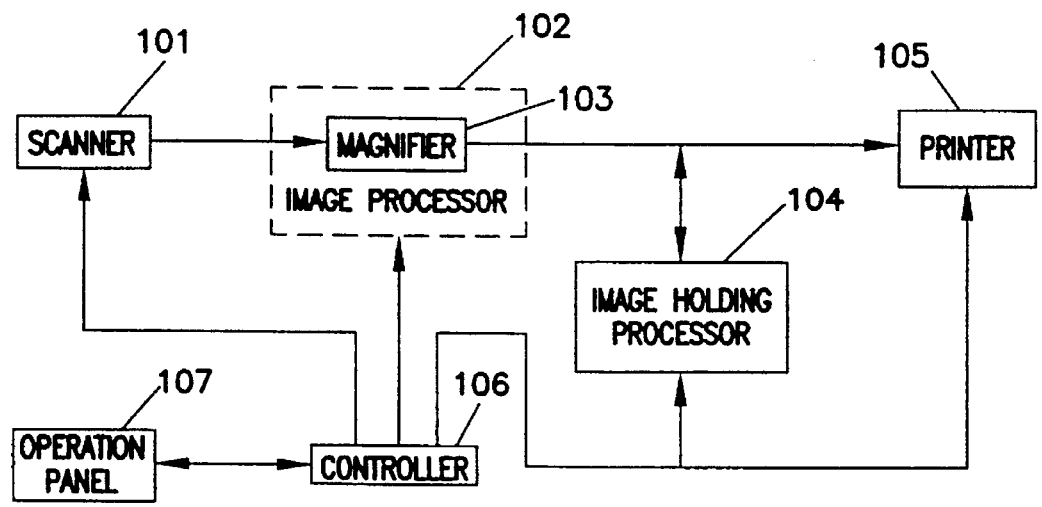
FIG. 1 is a block diagram of the first embodiment of the present invention.
Figure 3:
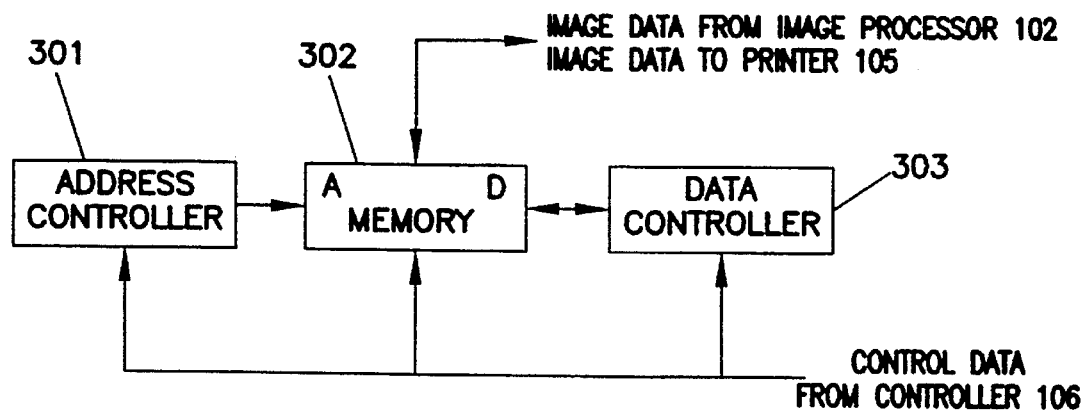
FIG. 3 is a block diagram of a image holding device in FIG. 1.

In FIG. 1, a conventional scanner 101 has a desired reading size or image area, for example A3 size. A conventional image processor 102 processes shading correction, gamma correction, and gradation correction of scanning signals (conversion from Red, Green, Blue signals to Yellow, Magenta, Cyan signals in case of color signal processing). A conventional magnifier 103 in image processor 102 enlarges and reduces the image read by the scanner 101. The signal output from the image processor 102 is fed to the input of a conventional printer 105 directly on data bus 110 as shown in FIG. 1 or by way of an image holding device in which the signal is held and then read on data bus 110 as shown in FIG. 3. A controller 106 controls the scanner 101, the image processor 102 (especially the magnifier), the image holding device 104, and the printer 105 by variable data input from the operation panel 107 by an operator.

Referring now to the figures, preferred embodiments of the invention will be described.

Figure 2A:
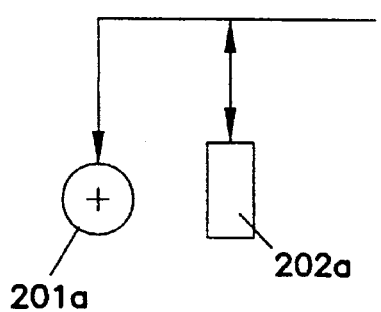
FIG. 2a is a schematic diagram of a one color printer.
Figure 2B:
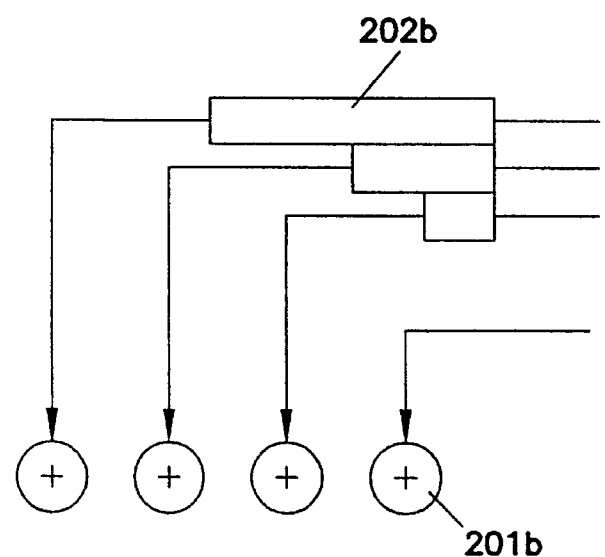
FIG. 2b is a schematic diagram of a four color printer.

In the printer 105, for example, an image with a maximum A3 size is printed on a sheet of paper. In the case where a color image is printed by one drum 201a as shown in FIG. 2(a), an image of a document is scanned four times by the scanner 101 and then each color component of Red, Green, Blue, and Black is drawn. Then, the data of Yellow, Magenta, Cyan, and Black are converted from Red, Green, Blue, and Black. After these converted data are stored in a memory 202a after each scan, the data are read and developed by the drum 201a. Also in the case where the color image is printed on a sheet of paper by four drums 201b which are installed in each desired position, the image of the document is scanned once by the scanner 101 and then each color component of Red, Green, Blue, and Black is drawn. Then, the data of Yellow, Magenta, Cyan, and Black are converted from Red, Green, Blue, and Black. These converted data are stored after being delayed in accordance with the installation interval of the four drums and they are read and then developed by the drums 202b. As shown in detail in FIG. 3, the image holding device has an address controller 301, a memory 302 and a data controller 303. A line memory, which is same as the memory 202a, is used as the memory 302 in the case of the one drum system. On the other hand, memories with a capacity the same as the memory 202b, are used in the case of the four drum system.

Figure 4:
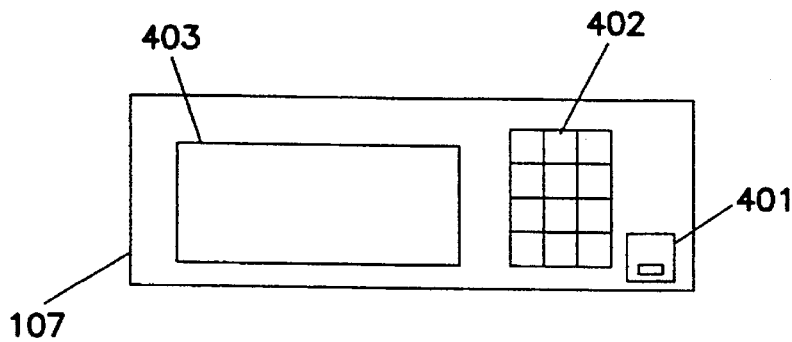
FIG. 4 is a functional diagram of an operation panel for use with the embodiment of FIG. 1.
Figure 5A:
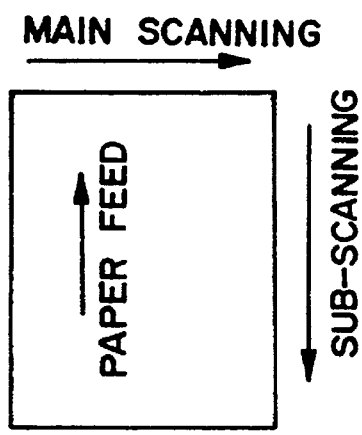
FIG. 5a is a schematic diagram showing the main and sub-scanning directions of a document.
Figure 5B:
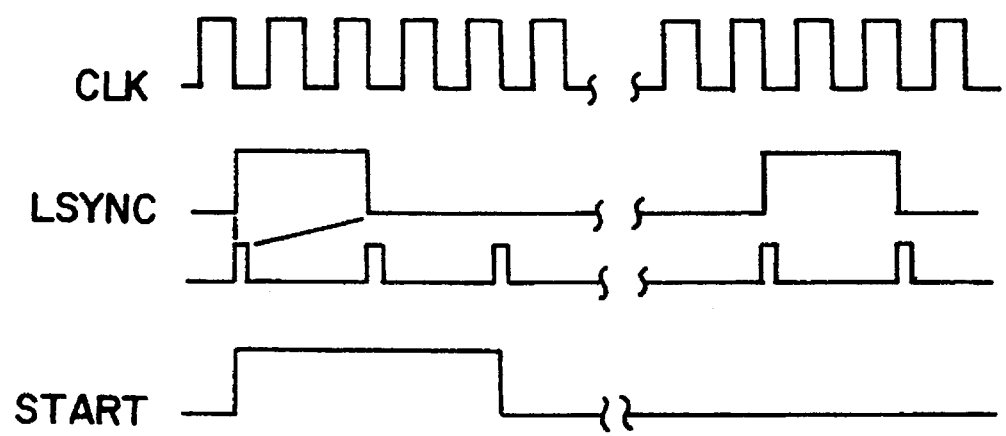

As shown in detail in FIG. 4, the operation panel 107 has a start key 401 for starting a scanning operation by the scanner 101 and numeral keys for input of the document size, the sheet size, magnification ratio, copy quantity and etc., and a liquid crystal panel for display of helpful information. The many kinds of input data to the operation panel are processed in the controller 106. The controller generates a main scanning clock signal CLK, a sub-scanning clock signal (a horizontal synchronizing signal) LSYNC and a start pulse START in accordance with the reading direction of the scanner 101 as shown in FIG. 5(a), and outputs them to the address controller 301, the memory 302 and the data controller 303. It also generates a counter up/down signal U/D and a memory read/write signal R/W. The U/D signal is output to the address controller 301 and the R/W signal is output to the memory 302.

The scanner 101, the processor 102 including the magnifier 103, the printer 105, the controller and the operation panel 107 as described above are basically same as those described in U.S. Pat. No. 5,122,833, incorporated by reference herein, U.S. patent application No. 870,453, U.S. Pat. No. 5,325,209, also incorporated by reference herein, and those of a digital copying machine model number DS320 made by Ricoh Company, Ltd. of Japan, the present assignee.

Figure 6:
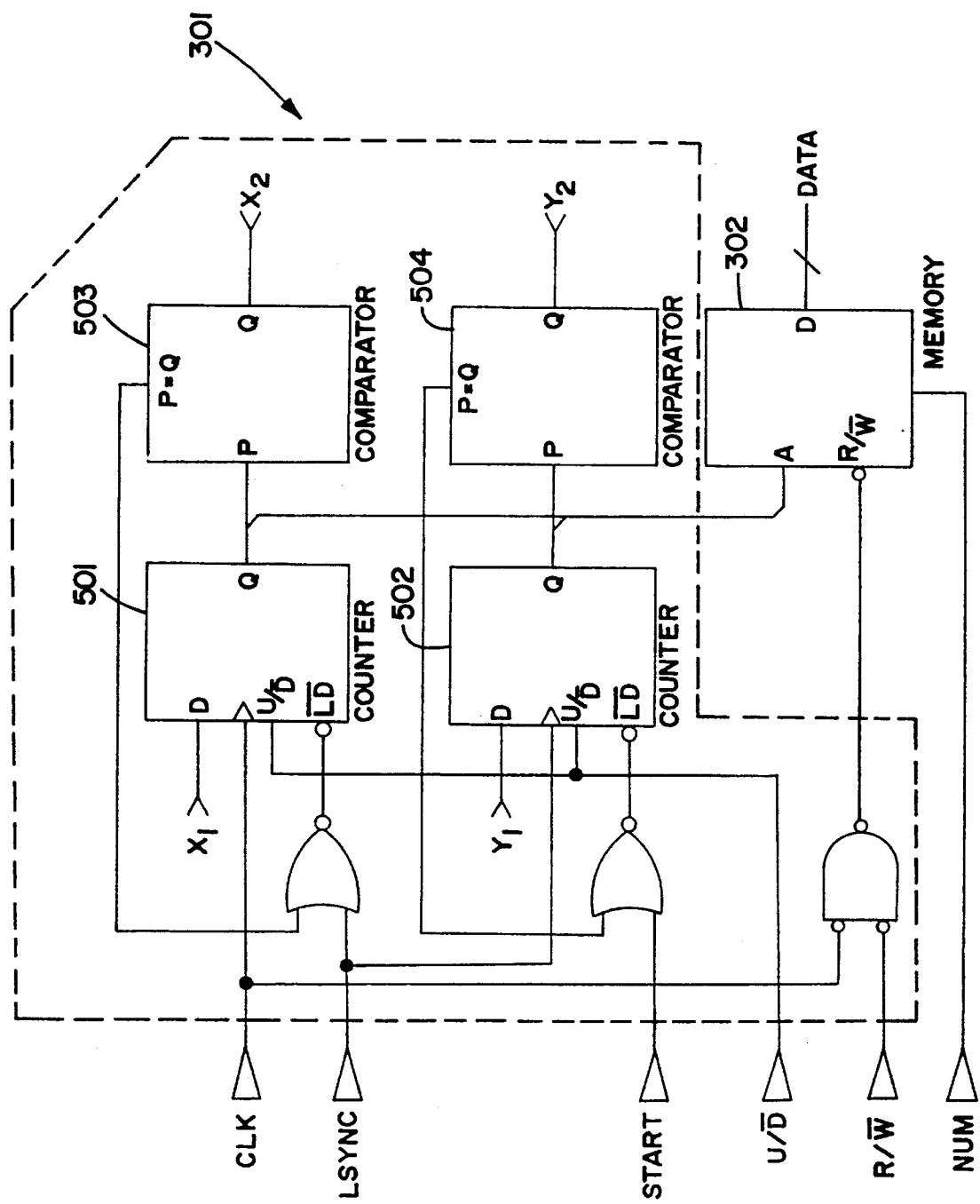
FIG. 6 is a block diagram of the address controller shown in FIG. 3.

Next, referring to the block diagram shown in FIG. 6 the address controller 301 is described.

The main scanning clock signal CLK, the counter up/down signal U/D, the reading or writing start position X1 of X direction of the memory from the controller 106 are input to the up/down counter 501 of the main scanning direction (X direction) from the controller 106. Also an output signal from a comparator 503 and the sub-scanning signal LSYNC are input to the LOAD(LD) terminal of the counter 501 through an OR gate 510. The output signal therefrom is input to the comparator 503 of X direction and an address terminal of the memory 302. The output signal from the counter 501 and the reading or writing end position X2 of X direction of the memory from the controller 106 are input to the comparator 503. The output signal therefrom is input to the counter 501 through the OR gate 510.

Similarly, the sub-scanning clock signal LSYNC, the counter up/down signal U/D, the reading or writing start position Y1 of Y direction of the memory from the controller 106 are input to a up/down counter 502 of the sub-scanning direction (Y direction) from the controller 106. Also an output signal from a comparator 504 and a start pulse START are inputted to LOAD(LD) terminal of the counter 502 through an OR gate 512. The output signal therefrom is input to the comparator 504 of Y direction and the address terminal of the memory 302. The output signal from the counter 502 and the reading or writing end position Y2 of Y direction of the memory from the controller 106 are input to the comparator 504. The output signal therefrom is input to the counter 502 through the OR gate 512. Moreover, a memory plane indicating signal NUM from the controller 106 is input to the memory 302 and D terminal of the memory 302 is connected to the data controller 303.

Figure 7:
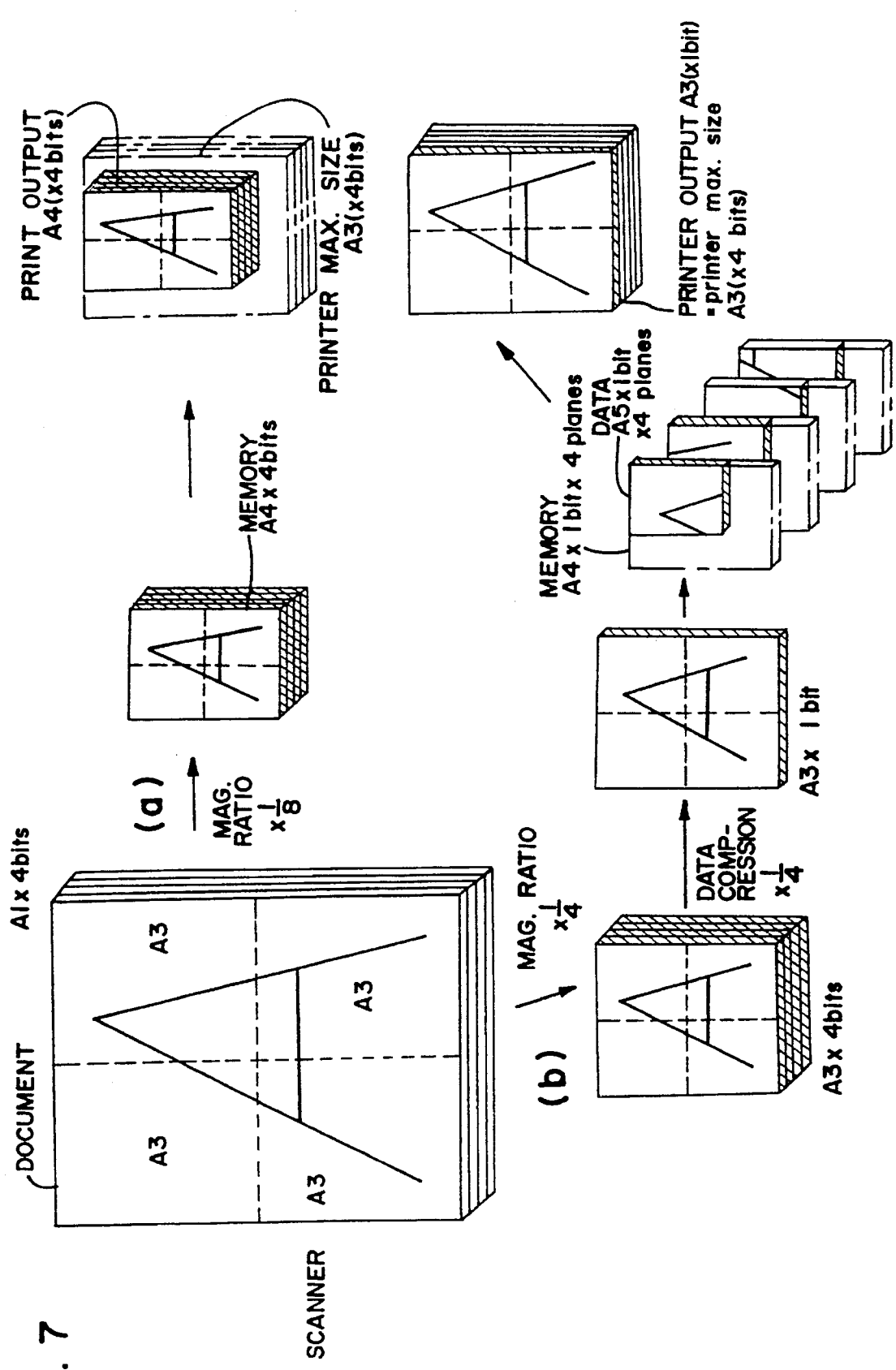
FIG. 7 shows schematically the several ways images may be combined in accordance with the first embodiment.

Next, the operation of the image holding device is described. In the up/down counter 501 of the main scanning direction (X direction), the main scanning clock signal CLK is counted up or down from the writing or reading start position of the X direction in the memory 302. Then in the comparator 503, when the count value of the counter 501 equals the writing or reading end position X2 of the X direction, the count value in counter 501 is loaded into comparator 503. Then the counter 501 outputs address signals, which are signals from the start position to the end position, to the memory 302 as shown in FIG. 7.

Similarly, in the up/down counter 502 of the sub-scanning direction (Y direction), the sub-scanning clock signal LSYNC is counted up or down from the writing or reading start position of the Y direction in the memory 302. Then in the comparator 504, when the count value of the counter 502 equals the writing or reading end portion Y2 of the Y direction, the count value in counter 502 is loaded into comparator 504. Then the counter 502 outputs address signals, which are signals from the start position to the end position, to the memory 302 as shown in FIG. 7. The reading or writing from X1 to X2 and from Y1 to Y2 finishes as described above and then "0" of the memory plane indicating signal is changed into "1" and the above operation repeats. This operation is repeated the same number of times as there are divisions of the documents. For the first embodiment, the operation is repeated four times because the large document is divided into quarters.

Next, referring to FIG. 6, 7, 8, the operating sequence of the first preferred embodiment is described. For purposes of describing the preferred embodiment, the following conditions are assumed. The size of the document is, for example A1. The maximum reading size of the scanner 101 is, for example A3, which is smaller than the size of the A1 document. The capacity size of the memory 302, which is smaller than the size of the A1 document is, for example A4. The maximum output size of the printer which is larger than the memory size is, for example A3.

Figure 8:
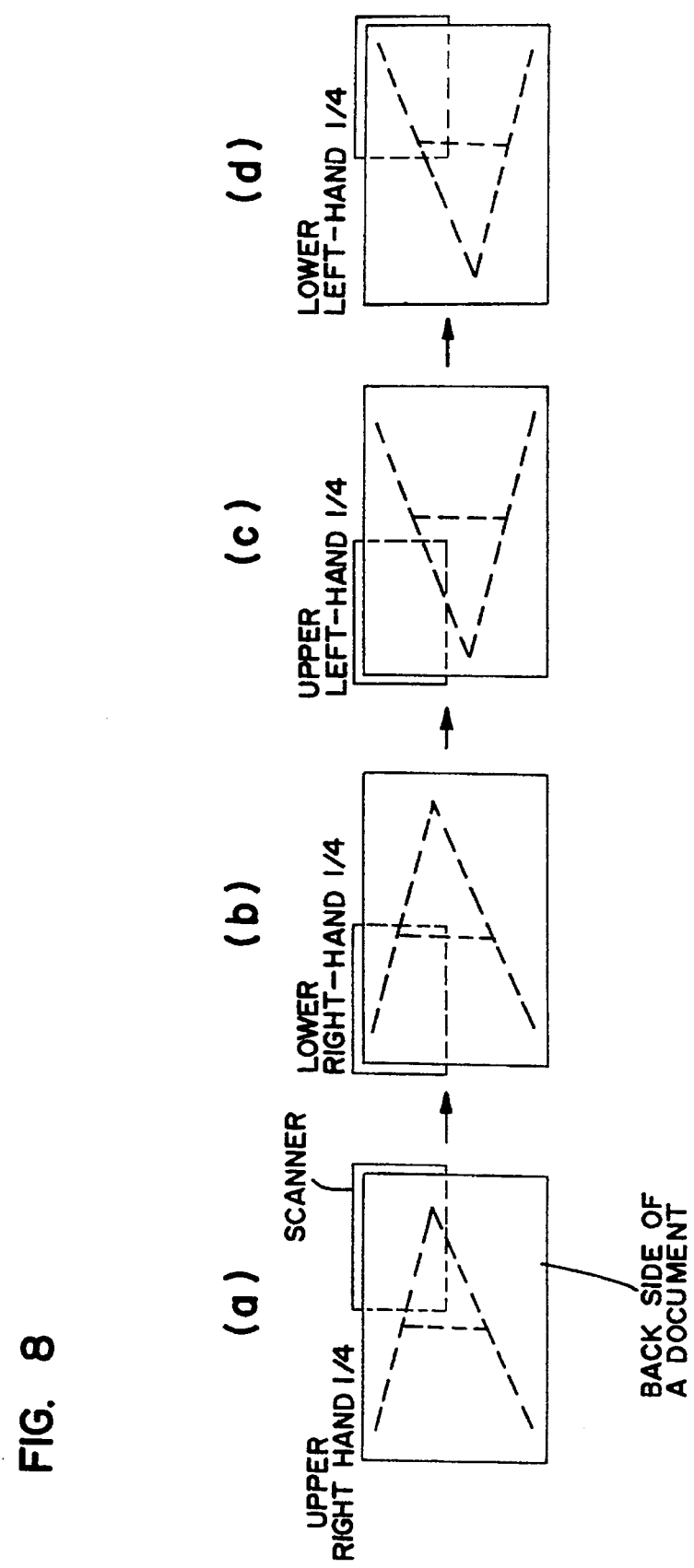
FIG. 8 shows schematically how to scan different portions of a document.

Initially, the document size A1 is input from the operator panel 107 to the controller 106. The controller 106 sets (1) the magnification ratio (memory size)/(document size)=A4/A1=⅛, (2) the start position (X1,Y1)=(105 mm,0 mm) for writing the image data of the quarter upper right-hand area of the document into the quarter upper right-hand area of the memory 302, (3) the end position (X2,Y2)=(210 mm,149 mm) for that, (4) the count up/down signal U/D=1 (count up) and (5) the read/write signal R/W=0 (write). At this time, the document is set accurately on the determined position of the glass board of the copying machine for scanning. In other words, the edge of the document is set along a reference line on the glass board for scanning, so that the quarter upper right-hand area of the document can be read as shown in FIG. 8(a). Then the start key 401 is pushed, the image of the A3 size- quarter upper right-hand area of the A1 size- document is read by the scanner 101. Then it is reduced to A6 size, which is the magnification ratio=⅛ of the size A3 of the scanner 101, by the magnifier 103. Then the A6 size-reduced image data are written into the quarter upper right-hand area of the memory 302.

Second, the document is set on the glass board for scanning as described above so that the quarter lower right-hand area of the document can be read as shown in FIG. 8(b), then the start key is pushed. The control means 106 sets (1) the magnification ratio (memory size)/(document size)=A4/A1=⅛, (2) the start position (X1,Y1)=(105 mm,149 mm) for writing the image data of the quarter lower right-hand of the document into the quarter upper right-hand area of the memory 302, (3) the end position (X2,Y2)=(210 mm,298 mm) for that, (4) the count up/down signal U/D=1 (count up) and (5) the read/write signal R/W=0 (write). At this time, the image of the A3 size- quarter lower right-hand area of the A1 size-document is read by the scanner 101, then it is reduced to A6 size, which is the magnification ratio=⅛ of the size A3 of the scanner 101, by the magnifier 103. Then the A6 size-reduced image data are written into the quarter lower right-hand area of the memory 302. As a result, the total image data of A6 size are stored in the memory 302.

Third, the document is similarly set on the glass board for scanning so that the quarter upper left-hand area of the document can be read as shown in FIG. 8(c). Now it is set as turned over at 180 degrees of FIGS. 8(a) and 8(b). Then the start key is pushed. The control means 106 sets (1) the magnification ratio (memory size)/(document size)=A4/A1= ⅛, (2) the start position (X1,Y1)=(105 mm,149 mm) for writing the image data of the quarter upper left-hand of the document into the quarter upper left-hand area of the memory 302, (3) the end position (X2,Y2)=(0 mm,0 mm) for that, (4) the count up/down signal U/D=0 (count down) and (5) the read/write signal R/W=0 (write). At this time, the image of the A3 size- quarter upper left-hand area of the A1 size-document is read by the scanner 101, then it is reduced to A6 size, which is the magnification ratio=⅛ of the size A3 of the scanner 101, by the magnifier 103. Then the A6 size-reduced image data are written into the quarter upper left-hand area of the memory 302.

Finally, the document is similarly set on the glass board for scanning so that the quarter lower left-hand area of the document can be read as shown in FIG. 8(c), then the start key is pushed. The control means 106 sets (1) the magnification ratio (memory size)/(document size)=A4/A1=⅛, (2) the start position (X1,Y1)=(105 mm,298 mm) for writing the image data of the quarter lower left-hand of the document into the quarter lower left-hand area of the memory 302, (3) the end position (X2,Y2)=(105 mm,298 mm) for that, (4) the count up/down signal U/D=0 (count down) and (5) the read/write signal R/W=0 (write). At this time, the image of the A3 size- quarter lower left-hand area of the A1 size-document is read by the scanner 101, then it is reduced to A6 size, which is the magnification ratio=⅛ of the size A3 of the scanner 101, by the magnifier 103. Then the A6 size-reduced image data are written into the quarter lower left-hand area of the memory 302.

As a result, the whole image of the A1 size-document is reduced by the magnification ratio ⅛ and stored in A4 size-memory 302. Now in FIGS. 8(c) and 8(d), the reason why the document is turned over 180 degrees from the document position in FIGS. 8(a) and 8(b) is that hinges for a document press board that covers the glass plate prevents the document from being scanned in the same orientation as FIGS. 8a and 8b. If the document press board is removed, the document can be read by moving parallel around the glass plate.

Writing as described above is completed, then the controller 106 sets (1) the start position (X1,Y1)=(0 mm,0 mm) for reading the memory 302, (2) the end position (X2,Y2)= (200 mm,298 mm) for that, (3) the count up/down signal U/D=1 (count up) and (4) the read/write signal R/W=1 (read). At this time, the A4 size-combining image data are read from the memory 302 and printed on the A4 size-a sheet of paper as shown in FIG. 7(a).

Thus, according to the above, for the first embodiment, the large size document, for example A1 size, can be combined and printed by the magnifier 103 and the image holding device 104 even though the scanner size, for example A3, is smaller than the size of the large document. Now in this embodiment the A1 size-document is reduced to A4 size which is the size of the memory and the reduced document is output by the printer 105 the size of which is larger than that of the memory 302. On the contrary, if the size of the memory is larger than or equal to the size of the printer, the magnification ratio is (the maximum size of the printer)/(the size of the document). That is, (a) if (the size of the memory)<(the size of the maximum size of the printer), the magnification ratio=(the size of the memory)/(the size of the document)

(b) if (the size of the memory)>=(the size of the maximum size of the printer), the magnification ratio=(the maximum size of the printer)/ (the size of the document).

In addition, in the present embodiment, the position of the A3 size-divided image is recovered when the image data are written into the memory, but the recovery of the divided image may be done when the data are read from the memory.

Next a second embodiment of the present invention is described. In this embodiment, it is noted that a larger size document for example A1 or A2 is often a design drawing of the like that does not have gradation, that is binary-data. Accordingly, in the case of a design document, the 4 bits provided by $2^4$ values-data is unnecessary. The image data can be converted to 1 bit that is binary-data. As a result, the amount of the data are compressed to a data compression ratio of ¼.

In the present example, the size of the document is A1, the data amount of the document is A1*4 bits, the size of the memory 302 is A4, the capacity of the memory is A4*4 bits, and the maximum size of the printer 105 means is A3, the capacity of the printer is A3*4 bits, similar to the first embodiment. When the magnification ratio (the first magnification ratio) is (the capacity of the memory)/[(the data amount of the document)*(data compression ratio)]=(A4*4 bits)/[(A1*4 bits)* (¼)] =½ the reduced data can be stored in the memory. But the printed output size becomes:

(the data amount of the document)*(the magnification ratio)*(the data compression ratio)=(A1*4 bits)*(½)*(¼)= (A1*4 bits)*(⅛)=(A1*⅛)*(4 bits)= (A4)*(4 bits)=(A2)*(1 bit), and the printed output size A2 exceeds the maximum size A3 of the printer when the printed output is binary data (1 bit). As a result, the magnification ratio (second magnification ratio) has to be:

(the maximum size of the printer)/(the size of the document)=A3/A1=¼ as shown in FIG. 7(b).

That is, the magnification ratio has to be the following. The maximum size of the printer is compared to (the size of the document)*(the first magnification ratio) which equals (the size of the document)*[(the maximum size of the printer)/{(the size of the memory)*(data compression ratio)}]. This, in turn, equals (the size of the memory)/(the data compression ratio), (a) if (the maximum size of the printer)<[(the size of the memory)/(the data compression ratio)], the magnification ratio equals (the maximum size of the printer means)/(the size of the document);

(b) if (the maximum size of the printer)>=[(the size of the memory)/(the data compression ratio)], the magnification ratio equals (the size of the memory)/[(the size of the document)*(the data compression ratio)].

As a result, the size of the memory 302 and the maximum size of the printer 105 are used efficiently, particularly in case of (a), where the size of the memory is smaller than the maximum size of the printer. The maximum size of the printer can be printed without alteration.

Figure 9:
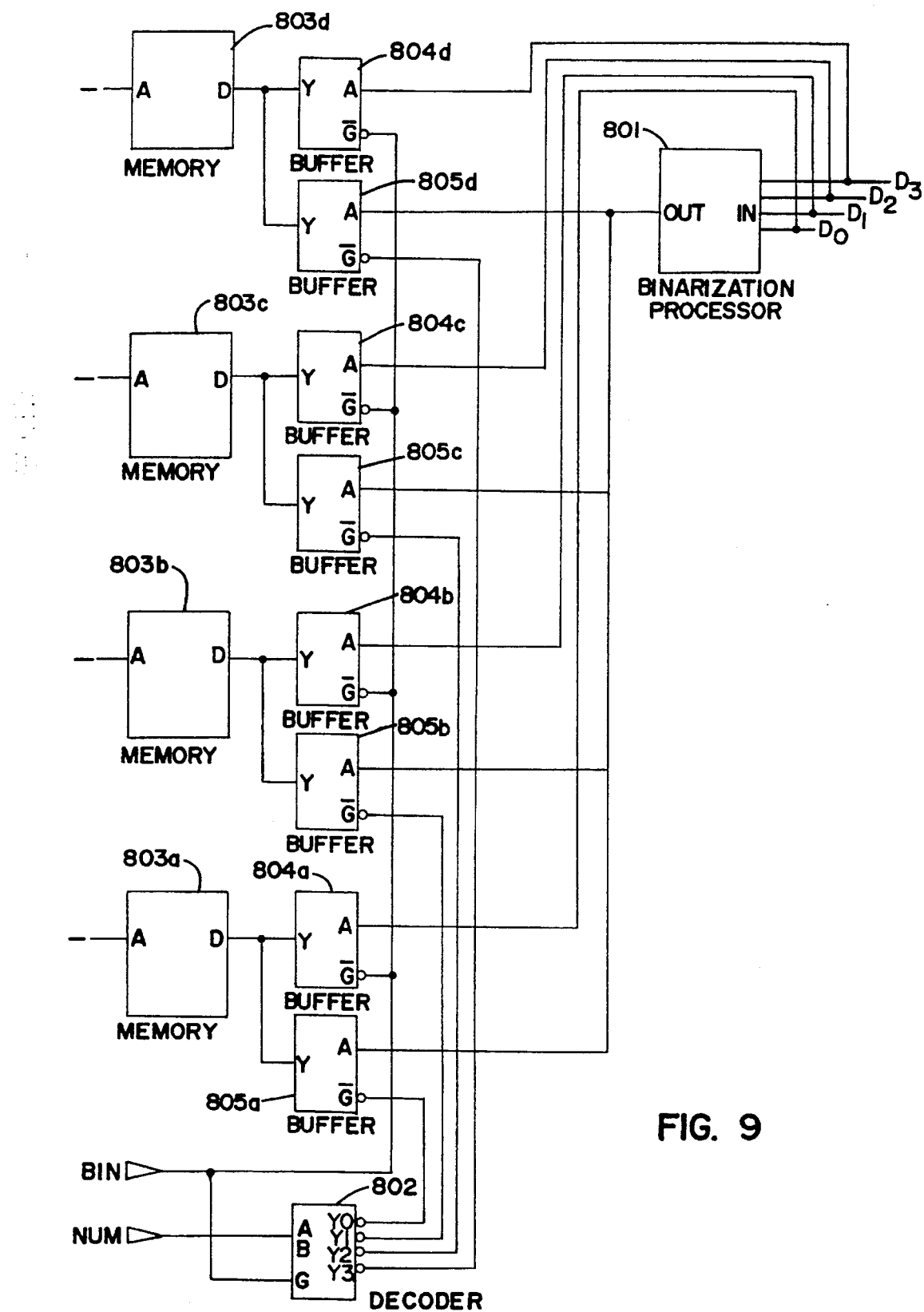
FIG. 9 shows a block diagram of an image holding memory for a second embodiment of the present invention.

FIG. 9 shows a detailed structure of a memory and a data controller used in the second embodiment. The address block for the memory and data controller of FIG. 9 is the same as that of the first embodiment shown in FIG. 3.

The output data from the magnifier 103 are input to a binarization processor 801 or 4-to-1 converter and the output data from the 2 values processor 801 are input to input terminals(A) of buffers 805a, 805b, 805c, 805d. Also the output data from the magnifier 103 are input to input terminals(A) of buffers 804a, 804b, 804c, 804d. The binarization process select signal BIN from the operation panel 107 is input to output control terminals(G) of the buffer 804a, 804b, 804c, 804d and a decoder 802. The memory plane indicating signal NUM from the controller 106 is input the input terminals(A,B) of the decoder and the output signals from output terminals (Y0,Y1,Y2,Y3) of the decoder 802 are input to the output control terminals(G) of the buffers 805a, 805b, 805c, 805d. The output signals from the buffers 804a–d, 805a–d are input to the data terminals of the memories 803a–d.

Next the operation of the second embodiment of the image holding device is described. The data from the magnifier, for example 4 bit-data which are $2^4$ values-data D3, D2, D1, D0, are compressed to 1 bit-data which are binary-data (0, 1) by 2 values processor 801. Then the amount of the data is reduced. NUM signal in accordance with reading order of the document that is upper right side, lower right side, upper left side and lower left side is input to a decoder 802, that sets buffers 805a, 805b, 805c and 805d to an enabled condition in order. As a result, binary-data are stored in each memory 803a, 803b, 803c and 803d. Now the on/off operation of the binarization processor 801 is controlled by the signal BIN from the operation panel 107, either 1 bit data not having gradation or 4 bits data having gradation is selected. The operation thereafter is the same as that of the first embodiment.

Thus, according to the above, for the second embodiment, the larger size of the document, for example A1 size, can be combined and printed by the magnification means 103 and the image holding device 104 even though the scanner size, for example A3, is smaller than the size of the large document. Moreover as it is noted that a large size document for example A1 or A2 is often a design drawing or the like that does not have gradation, the use of binary-data in this second embodiment, allows the size of the memory and the maximum size of the printer to be used efficiently, particularly when (the maximum size of the printer)< [(the size of the memory)/(the data compression ratio)]. In this case, the maximum size of the printer can be used even though the size of the memory is smaller than the maximum size of the printer.

Modifications and variations of the above-described embodiments of the present invention are possible, as appreciated by those skilled in the art in light of the above teachings. It is therefore to be understood that, within the scope of the appended claims and their equivalents, the invention may be practiced otherwise than as specifically described.

What is claimed is:

1. A copying machine for scanning a large document of a first size and printing it on a printer, in which a latent image on a photosensitive body is developed by a developing device and is transferred onto a sheet of paper, the copying machine comprising:

a scanner having a scanning area of a second size which is smaller than the first size, the scanner constituting means for scanning every portion of a whole area of the large document and for producing a scanning signal representative of the area thus scanned;

a memory having a storage capacity for holding data representative of a document of a third size;

a magnifier for adjusting by a magnification ratio a size of an image represented by the scanning signal to fit within the storage capacity of the memory, the magnification ratio being adjusted while taking into account not only the storage capacity of the memory but also the maximum size of the printer; and the printer, for printing a document of a fourth size by reproducing in eye-readable form the data held in the memory.

2. The copying machine of claim 1, wherein:

the printer uses four colors of toner, including yellow, magenta, cyan and black.

3. The copying machine of claim 1, wherein:

the scanner scans portions which constitute the first size divided by an integer greater than or equal to 1.

4. The copying machine of claim 3, wherein:

the scanner scans portions which constitute the first size divided by an integer greater than or equal to 2.

5. The copying machine of claim 4, wherein:

the scanner scans portions which constitute the first size divided by 4.

6. The copying machine of claim 1, wherein:

when the third size is less than the fourth size, the magnification ratio is equal to a quotient of the third size and the first size.

7. The copying machine of claim 1, wherein:

when the third size is greater than or equal to the fourth size, the magnification ratio is equal to a quotient of the fourth size and the first size.

8. The copying machine of claim 1, wherein:

the scanner scans portions of the large document along its length or width; and the copying machine further comprises an address control means for generating address signals associated with the memory, so as to properly orient image data for the scanned portions.

9. The copying machine of claim 1, further comprising:

binarization processing means, responsive to the scanner and coupled to the memory, for compressing multilevel data of $2^k$ levels into binary data which are input to the memory, wherein k is an integer greater than or equal to 2.

10. The copying machine of claim 9, wherein:

when the third size is less than the fourth size, the magnification ratio is equal to a quotient of the third size and the first size.

11. The copying machine of claim 9, wherein:

when the third size is greater than or equal to the fourth size, the magnification ratio is equal to a quotient of the fourth size and the first size.

* * * * *